(12) United States Patent
Tian et al.

(10) Patent No.: US 12,175,689 B2
(45) Date of Patent: Dec. 24, 2024

(54) MEDICAL IMAGE REGISTRATION METHOD BASED ON PROGRESSIVE IMAGES

(71) Applicant: Zhengzhou University of Light Industry, Zhengzhou (CN)

(72) Inventors: Erlin Tian, Zhengzhou (CN); Qian Zheng, Zhengzhou (CN); Jiaofen Nan, Zhengzhou (CN); Xiao Zhang, Zhengzhou (CN); Weide Liang, Zhengzhou (CN)

(73) Assignee: Zhengzhou University of Light Industry, Zhenzhou (CN)

( * ) Notice: Subject to any disclaimer, the term of this patent is extended or adjusted under 35 U.S.C. 154(b) by 304 days.

(21) Appl. No.: 17/851,066

(22) Filed: Jun. 28, 2022

(65) Prior Publication Data

US 2022/0414903 A1    Dec. 29, 2022

(30) Foreign Application Priority Data

Jun. 28, 2021    (CN) .......................... 202110719973.0

(51) Int. Cl.
*G06T 7/33* (2017.01)
*G06T 3/02* (2024.01)
(Continued)

(52) U.S. Cl.
CPC ............... *G06T 7/337* (2017.01); *G06T 3/02* (2024.01); *G06T 7/37* (2017.01); *G06V 10/761* (2022.01);
(Continued)

(58) Field of Classification Search
CPC .. G06T 7/337; G06T 3/02; G06T 7/37; G06T 2207/10081; G06T 2207/10088;
(Continued)

(56) References Cited

U.S. PATENT DOCUMENTS

2017/0178307 A1*   6/2017   Yan .......................... G06T 5/50

FOREIGN PATENT DOCUMENTS

CN    106709867 A    5/2017
CN    111125416 A    5/2020
(Continued)

OTHER PUBLICATIONS

Pradhan, S. and Patra, D., 2016. Enhanced mutual information based medical image registration. IET Image Processing, 10(5), pp. 418-427.*

(Continued)

*Primary Examiner* — Zhitong Chen
(74) *Attorney, Agent, or Firm* — Bayramoglu Law Offices LLC (57) ABSTRACT

A two-stage medical image registration method based on progressive images (PIs) to solve the technical problem of low registration accuracy of traditional image registration methods includes: merging a reference image with a floating image to generate multiple intermediate PIs; registering, by a speeded-up robust features (SURF) algorithm and an affine transformation, the floating image with the intermediate PIs to acquire coarse registration results; registering, by the SURF algorithm and the affine transformation, the reference image with the coarse registration results to acquire fine registration results; and comparing the fine registration results of the intermediate PIs, which are acquired by iteration, and selecting an optimal registration result as a final registration image. The method can achieve multimodal registration for brain imaging with MI, NCC, MSD, and NMI superior to those of the existing registration algorithms. The method effectively improves the registration accuracy through the progressive medical image registration strategy.

16 Claims, 6 Drawing Sheets

(51) Int. Cl.
*G06T 7/37* (2017.01)
*G06V 10/74* (2022.01)

(52) U.S. Cl.
CPC ............... *G06T 2207/10081* (2013.01); *G06T 2207/10088* (2013.01); *G06T 2207/20221* (2013.01); *G06T 2207/30016* (2013.01)

(58) Field of Classification Search
CPC . G06T 2207/20221; G06T 2207/30016; G06T 2207/20016; G06T 7/33; G06T 7/30; G06T 7/0012; G06V 10/761; G06V 10/462; G06V 10/758
See application file for complete search history.

(56) References Cited

FOREIGN PATENT DOCUMENTS

| | | | |
|---|---|---|---|
| CN | 111127353 A | 5/2020 | |
| CN | 111445389 A | 7/2020 | |
| DE | 102010022266 A1 | 12/2011 | |

OTHER PUBLICATIONS

Liu Yueliang, et al., Lung 4D-CT Image Registration Based on Regression Prediction, Chinese Journal of Biomedical Engineering, 2017, pp. 513-519, vol. 36, No. 5.

Luminita Moraru, et al., Gaussian mixture model for texture characterization with application to brain DTI images, Journal of Advanced Research, 2019, pp. 15-23, vol. 16.

Tom Vercauteren, et al., Diffeomorphic Demons: Efficient Non-parametric Image Registration, NeuroImage, 2009, pp. 1-29, vol. 45, No. 1.

Frederik Maes, et al., Medical Image Registration Using Mutual Information, Proceedings of the IEEE, 2003, pp. 1699-1722, vol. 91, No. 10.

David G. Lowe, Object Recognition from Local Scale-Invariant Features, Proc. of the International Conference on Computer Vision, Corfu, 1999, pp. 1-8.

Herbert Bay, et al., SURF: Speeded Up Robust Features, pp. 1-14.

Guangming Ji, MR Brain Image Registration, Master's Thesis Wuhan University of Technology (wut), 2016, pp. 1-62.

\* cited by examiner

MEDICAL IMAGE REGISTRATION METHOD BASED ON PROGRESSIVE IMAGES

CROSS REFERENCE TO THE RELATED APPLICATIONS

This application is based upon and claims priority to Chinese Patent Application No. 202110719973.0, filed on Jun. 28, 2021, the entire content of which is incorporated herein by reference.

TECHNICAL FIELD

The present disclosure relates to the technical field of medical image registration and, in particular, to a two-stage medical image registration method based on progressive images (PIs).

BACKGROUND

With the rapid development of computer technology and medical technology, medical images of different modalities can be acquired by means of computed tomography (CT) and nuclear magnetic resonance (NMR), etc. In recent years, image registration technology has been widely used in focus localization, rehabilitation therapy, intraoperative guidance, and radiological diagnosis. Therefore, medical image registration technology has received extensive attention in clinical applications.

There are two types of image registration methods, namely intensity-based image registration and feature-based image registration. The intensity-based image registration plays an important role in the diagnosis and treatment of medical diseases. Since the end of the $20^{th}$ century, researchers in China and other countries have proposed many image registration algorithms. For example, Vercauteren et al. developed the diffeomorphic Demons algorithm with the Lie group theory in spatial transformation on continuous domains. Maes et al. proposed to use mutual information (MI) as a similarity measure for medical image registration. Guangming JI used the B-spline to refine the results after registering the medical image based on the Demons algorithm. For feature-based image registration, the feature points of the images are extracted and matched, and then the transformation parameters between the images are derived by calculating the matching relationship between the feature points to finally complete the registration between the images. There are many classic feature matching algorithms. For example, in 1999, D. G. Lowe et al. proposed the scale-invariant feature transform (SIFT) algorithm. H. Bay et al. proposed the speeded-up robust features (SURF) algorithm by introducing an integral image to reduce the computation of feature points based on the SIFT algorithm. The SURF algorithm not only has the advantages of the SIFT algorithm in image scaling, illumination variation, etc., but also reduces the computation of feature points.

The above image registration methods are attributed to traditional image registration methods. In recent years, the deep learning (DL)-based image registration methods have become popular. However, the DL-based image registration methods have common problems in the field of medical imaging, such as long training time, high requirements for hardware, and poor model portability. In comparison, the traditional image registration methods have problems of unsatisfactory registration results and low accuracy due to the huge difference between the floating image and the reference image. To improve the image registration technology for brain imaging, the present disclosure proposes medical image registration based on progressive images (PIs) and the SURF algorithm (hereinafter referred to as PI-SURF).

In the feature-based image registration process, first, the feature points of the floating image F and the reference image R are extracted, and the coordinates of the matching point pairs of the two images are acquired. According to the spatial coordinates of the feature points, the mapping relationship between the two images is established and the parameters of an affine transformation are derived. Then, the floating image is transformed into the same coordinate space as the reference image. Finally, the floating image is reassigned by a bicubic interpolation algorithm to complete the whole registration process of the two images. Although the SURF algorithm has excellent performance, it still suffers from the problem of low registration accuracy. The reason for this phenomenon is that the SURF algorithm directly operates on the original image, so the original image is disturbed by the external environment, resulting in poor image quality and difficulty in feature extraction. Consequently, the count and accuracy of valid feature points decrease, thereby affecting the matching results. To solve the problem of large structural differences between the medical images, the present disclosure introduces the intermediate PIs to perform progressive medical image registration.

SUMMARY

To solve the technical problem of low registration accuracy of traditional image registration methods, the present disclosure proposes a two-stage medical image registration method based on progressive images (PIs). The present disclosure achieves accurate progressive image registration based on multiple intermediate PIs and a speeded-up robust features (SURF) algorithm (hereinafter referred to as PI-SURF). The present disclosure achieves desired registration results and high robustness in unimodal and multimodal image registration in brain imaging.

In order to achieve the above objective, the present disclosure provides the following technical solution that involves a two-stage medical image registration method based on progressive images (PIs), including the following steps:

step 1: merging a reference image R to be registered with a floating image F to be registered to generate multiple intermediate PIs;

step 2: registering, by a speeded-up robust features (SURF) algorithm and an affine transformation, the floating image F with the intermediate PIs to acquire coarse registration results;

step 3: registering, by the SURF algorithm and the affine transformation, the reference image R with the coarse registration results to acquire fine registration results; and step 4: comparing the fine registration results of the intermediate PIs, which are acquired by repeating steps 2 and 3, and selecting an optimal registration result as a final registration image.

In step 1, the merging includes:

averaging each corresponding pixel of the floating image F to be registered and the reference image R to be registered to acquire a resulting image, which is an intermediate progressive image $M_0$ of the floating image F and the reference image R, $M_0(x, y)=(R(x, y)+F(x, y))/2$;

where, R(x, y) F(x, y), and $M_0$ (x, y) denote values of pixels (x, y) of the reference image R, the floating image F, and the intermediate progressive image $M_0$, respectively; and merging the acquired intermediate progressive image with the floating image F to be registered or the reference image R to be registered to generate multiple intermediate PIs $M_0, M_1, \ldots, M_l$, where/denotes a count of the intermediate PIs.

The multiple intermediate PIs are generated as follows: taking the acquired intermediate progressive image as a reference image for an intermediate registration process and merging the reference image with the floating image F to generate the multiple intermediate PIs; or, taking the acquired intermediate progressive image as a floating image for the intermediate registration process and merging the floating image with the reference image R to generate the multiple intermediate PIs.

The coarse registration result is acquired as follows:

sub-step 1: taking an intermediate progressive image $M_k$ as a reference image and extracting, by the SURF algorithm, feature points of the floating image F and the intermediate progressive image $M_k$, k=0, 1, 2 . . . l;

sub-step 2: describing the feature points to acquire feature vectors and performing feature point matching based on a similarity of the feature vectors; and sub-step 3: spatially transforming, by the affine transformation, the floating image F, and calculating, by a least squares (LS) method, a transformation parameter; transforming the floating image F into a coordinate system of the reference image R through the transformation parameter; and registering, by a bicubic interpolation function, the transformed floating image F with the reference image R to acquire an initial registration result, which is the coarse registration result.

The method further includes: calculating, by the SURF algorithm, a pixel sum of a rectangle quickly through an integral image, where for a value I(x, y) of any pixel (x, y) in the image, a value $I_\Sigma(x, y)$ of the integral image is:

$$I_\Sigma(x, y) = \sum_{x' \leq x, y' \leq y} I(x', y');$$

where, I(x', y') denotes an original image, and the integral image is acquired by scanning all pixels in the original image I(x', y') once; and constructing, by the SURF algorithm, a Hessian matrix to generate stable edge points of the image; and determining, when a discriminant of the Hessian matrix acquires a local maximum, that a current point is brighter or darker than other point in a neighborhood to locate a key point.

The discriminant of the Hessian matrix is:

$$\det(H) = \frac{\partial^2 f}{\partial x^2} \frac{\partial^2 f}{\partial y^2} - \left(\frac{\partial^2 f}{\partial x \partial y}\right)^2,$$

f(x, y) being an image function.

The method further includes performing Gaussian filtering on the Hessian matrix to acquire:

$$H(x, y, \sigma) = \begin{bmatrix} L_{xx}(x, y, \sigma) & L_{xy}(x, y, \sigma) \\ L_{xy}(x, y, \sigma) & L_{yy}(x, y, \sigma) \end{bmatrix};$$

where, $L_{xx}(x, y, \sigma)$, $L_{xy}(x, y, \sigma)$, and $L_{yy}(x, y, \sigma)$ respectively denote convolutions of Gaussian second-order partial derivatives $$\frac{\partial^2}{\partial x^2} g(x, y, \sigma), \frac{\partial^2}{\partial x \partial y} g(x, y, \sigma), \text{ and } \frac{\partial^2}{\partial y^2} g(x, y, \sigma)$$

with the floating image at the pixel (x, y); and a two-dimensional Gaussian function g(x, y, σ) is expressed as:

$$g(x, y, \sigma) = \frac{1}{2\pi\sigma^2} \exp\left(-\frac{x^2 + y^2}{2\sigma^2}\right),$$

where σ denotes a spatial scale factor.

The method further includes: constructing, by the SURF algorithm, an image pyramid by convolving a scaling-up box filter with the floating image to form a scale space; comparing each pixel processed by the Hessian matrix with 26 points in a neighborhood of an image space and the scale space and locating key points preliminarily; and eliminating a key point with weak energy and a falsely located key point and preserving final stable feature points.

In sub-step 2, the feature points are described through two phases: first, assigning a direction to the feature point: calculating Haar wavelet responses of a point in x and y directions in a neighborhood with a radius of 6s centering on the feature point; performing Gaussian weighting with a factor of 2s on the calculated Haar wavelet responses in the x and y directions to acquire weighted values, where the weighted values denote direction components in horizontal and vertical directions, respectively, and s denotes a scale value where the feature point is located; and adding up Haar wavelet responses dx and dy in a sector-shaped slide window with an angle of π/3 centering on the feature point, and selecting a direction of a sector with a maximum as a dominant direction of the feature point; and second, selecting a square with a side length of 20s centering on the feature point; rotating a dominant direction of the square to the dominant direction of the feature point, and dividing the square into 16 sub-regions; selecting 25 sample points for each sub-region and calculating the Haar wavelet responses dx and dy of the sample point; summing the Haar wavelet responses and absolute values thereof of four smaller sub-regions to acquire four-dimensional vectors $\Sigma_{dx}$, $\Sigma_{dy}$, $\Sigma|d_x|$, and $\Sigma|d_y|$ and adding the vectors of 16 sub-regions to the feature vector to acquire a 64-dimensional feature vector descriptor.

The feature point matching is converted into similarity measurement between each feature descriptor, and a matching degree is determined by a Euclidean distance between two feature vectors. If feature points of the floating image F and the intermediate progressive image $M_1$ are x=($x_1, x_2, \ldots, x_t$) and x'=($x_1', x_2', \ldots, x_t'$) respectively, the Euclidean distance between the feature points x and x' is:

$$dist = \sqrt{\sum_{t=1}^{n}(x_t - x_t')^2}.$$

The affine transformation is essentially a simple superposition of a linear transformation and a translation transformation and includes the following basic transformations:

scaling, translation, rotation, reflection, and skew. The affine transformation is an important transformation in a two-dimensional plane and is widely used in image registration. In two-dimensional image transformation, the affine transformation is expressed as follows:

$$\begin{bmatrix} x \\ y \\ 1 \end{bmatrix} = \begin{bmatrix} R_{00} & R_{01} & T_x \\ R_{10} & R_{11} & T_y \\ 0 & 0 & 1 \end{bmatrix} \begin{bmatrix} x' \\ y' \\ 1 \end{bmatrix} = M \begin{bmatrix} x' \\ y' \\ 1 \end{bmatrix};$$

that is, $x=R_{00}x'+R_{01}y'+T_x$, $y=R_{10}x'+R_{11}y'+T_y$;

where M denotes an affine transformation matrix; x and y denote coordinates of a matching point in the reference image R; and x' and y' denote coordinates of a matching point in the floating image F.

After the floating image F is transformed into the coordinate system of the reference image R, an indirect resampling method is used to protect the registered image from pixel coverage.

The similarity measurement is intended to evaluate the registration between the floating image F and the reference image R and includes the following evaluation indexes:

mutual information (MI), which is a measure of a degree of mutual dependence between random variables, where the MI of the reference image R and the floating image F is:

$$MI(R,F)=H(R)+H(F)-H(R,F);$$

where H(R) and H(F) denote information in the reference image R and the floating image F, respectively; and H(R, F) denotes a joint entropy of the reference image R and the floating image F;

$$H(R)=-\Sigma P_R(r) \log_2 P_R(r)$$

$$H(F)=-\Sigma P_F(f) \log_2 P_F(f)$$

$$H(R,F)=-\Sigma P_{RF}(r,f) \log_2 P_{RF}(r,f)$$

where $P_R$ (r) and $P_F$ (I) denote independent probability distributions of pixel information in the reference image R and the floating image F, respectively; and $P_{RF}$ (r, f) denotes a joint probability distribution.

Normalized mutual information (NMI), which is a measure of a degree of similarity between the reference image R and the floating image F is expressed as follows:

$$NMI(R, F) = \frac{H(R) + H(F)}{H(R, F)}.$$

Normalized correlation coefficient (NCC) is expressed as follows:

$$NCC(R, F) = \frac{\sum_{x=1}^{m}\sum_{y=1}^{n}(R(x, y) - \overline{R})(F(x, y) - \overline{F})}{\sqrt{\sum_{x=1}^{m}\sum_{y=1}^{n}(R(x, y) - \overline{R})^2} \sqrt{\sum_{x=1}^{m}\sum_{y=1}^{n}(F(x, y) - \overline{F})^2}};$$

where, $\overline{R}$ denotes a mean of all pixels in the reference image R; $\overline{F}$ denotes a mean of all pixels in the floating image F; and m*n denotes a size of the image.

Mean square difference (MSD), which is a measure of similarity based on an intensity difference between the reference image R and the floating image F is expressed as follows:

$$MSD = \frac{\sum_{x=1}^{m}\sum_{y=1}^{n}(R(x, y) - (F(x, y))^2}{N};$$

where R(x, y) and F(x, y) denote intensities of pixels (x, y) in the reference image R and the floating image F, respectively; N denotes a total count of pixels in the image; and m*n denotes the size of the image.

The present disclosure has the following beneficial effects. The method of the present disclosure involves the following three steps: 1) merging a reference image with a floating image to generate multiple intermediate PIs, 2) registering the floating image with the intermediate PIs to acquire coarse registration results, and 3) registering the reference image with the coarse registration results to acquire fine registration results. The last two steps involve the establishment of a feature point matching relationship by the SURF algorithm and the realization of the image registration by the affine transformation. In unimodal registration for brain imaging, compared with the MI algorithm, the Demons algorithm, the Demons+B-spline algorithm, and the SURF algorithm, the MI, NCC, MSD, and NMI of the PI-SURF algorithm of the present disclosure are improved by 19.6%, 9.8%, 39%, and 13.2%, respectively. In multimodal registration for brain imaging, the MI, NCC, MSD, and NMI of the PI-SURF algorithm of the present disclosure are superior to those of these four registration algorithms. The experimental results also indicate that the progressive image registration strategy of the present disclosure effectively improves the accuracy of medical image registration.

BRIEF DESCRIPTION OF THE DRAWINGS

To describe the technical solutions in the embodiments of the present disclosure or in the prior art more clearly, the following briefly describes the drawings required for describing the embodiments of the present disclosure or the prior art. It will become apparent that the drawings in the following description show merely some embodiments of the present disclosure, and a person of ordinary skill in the art may still derive other drawings from these drawings without creative efforts.

FIGS. 2A-2D illustrate performance of progressive images on registration results, where

FIGS. 3A-3C illustrate feature point matching results of a floating image and a reference image, where

FIGS. 4A-4G illustrate comparison of unimodal registration results, where FIG. 4C shows the registration by MI.

FIGS. 5A-5G illustrate comparison of multimodal registration results, where FIG. 5C shows the registration by MI.

DETAILED DESCRIPTION OF THE EMBODIMENTS

The technical solutions of the embodiments of the present disclosure are clearly and completely described below with reference to the drawings. It will become apparent that the described embodiments are merely a part, rather than, all of the embodiments of the present disclosure. All other embodiments obtained by those of ordinary skill in the art based on the embodiments of the present disclosure without creative efforts should fall within the protection scope of the present disclosure.

Figure 1:
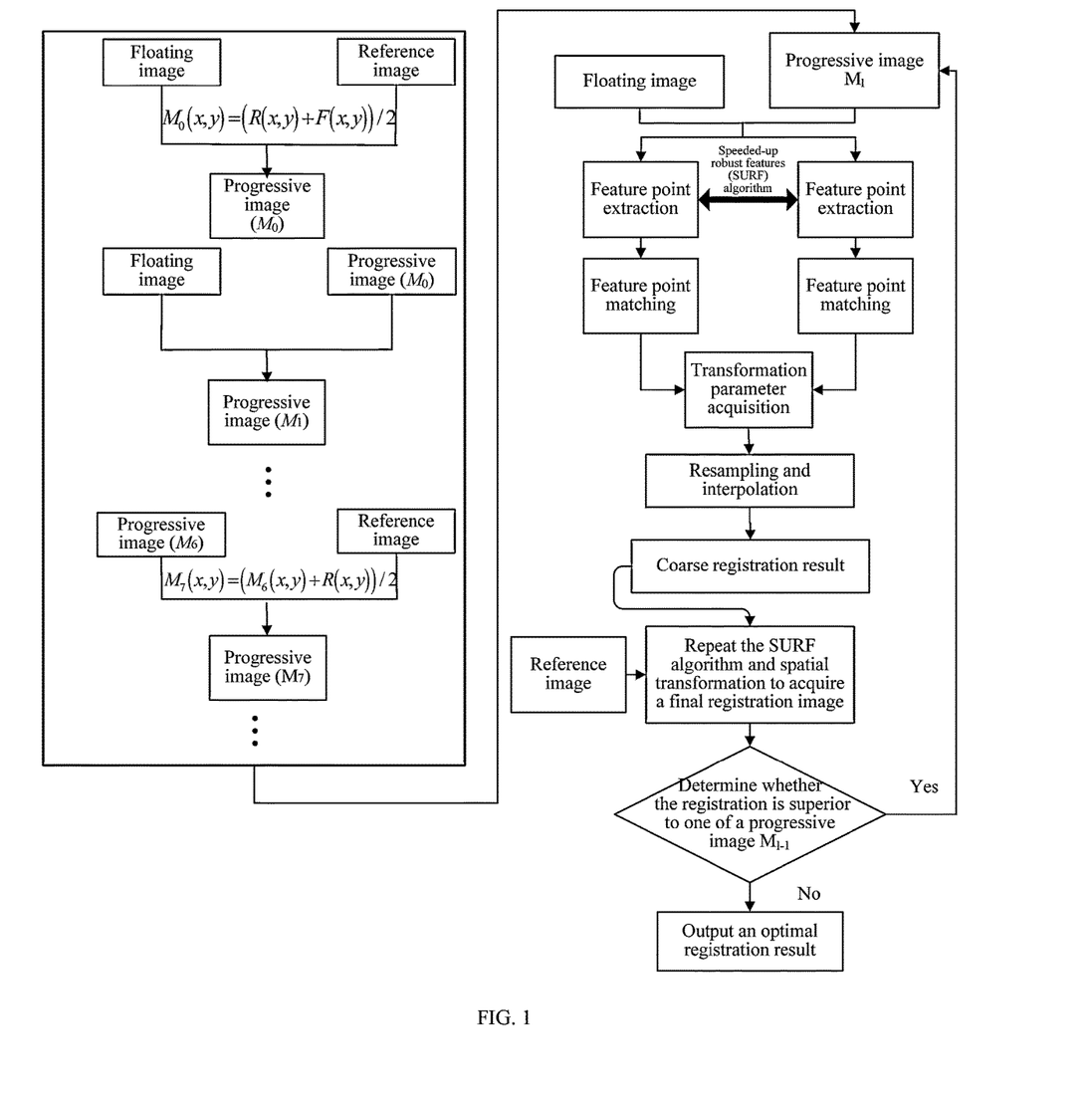
FIG. 1 is a flowchart of a two-stage medical image registration method based on progressive images (PIs) according to an embodiment of the present disclosure.
Figure 2A:
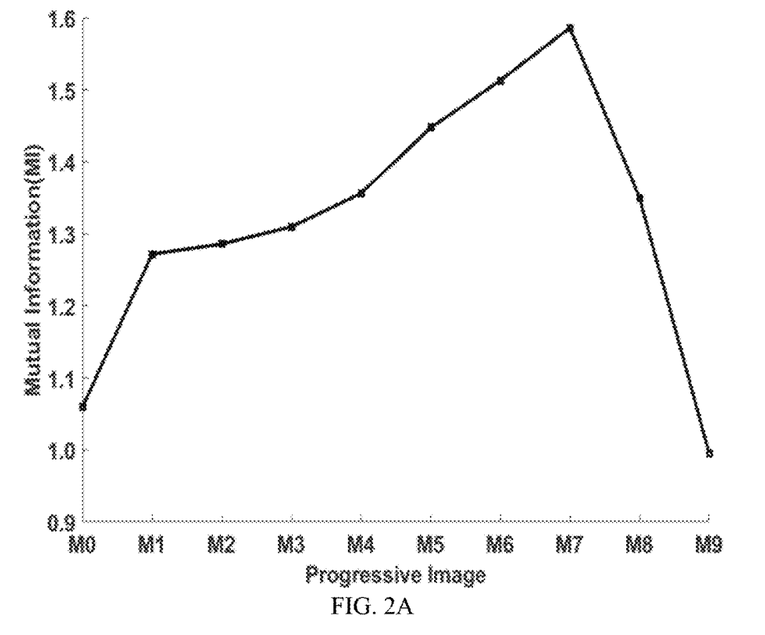
FIG. 2A shows the registration result measured by mutual information (MI)
Figure 2B:
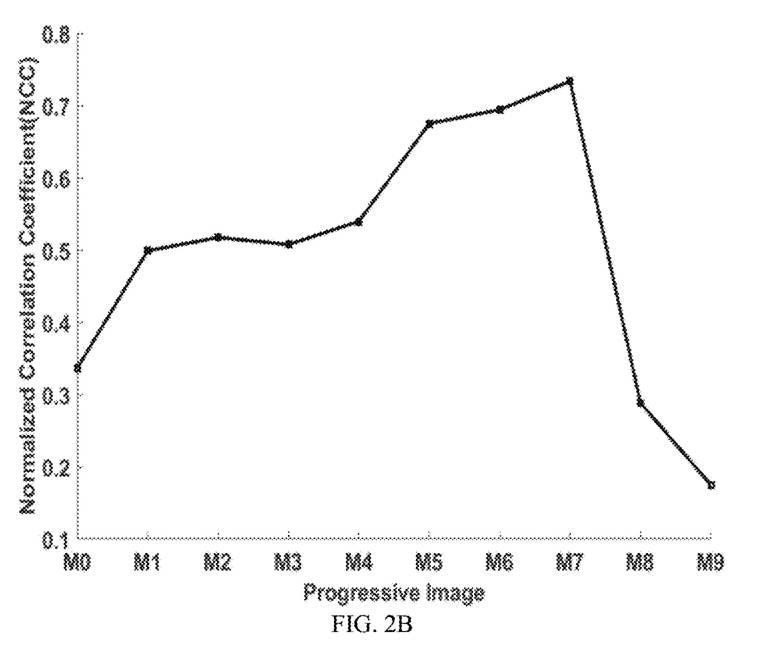
FIG. 2B shows the registration result measured by normalized correlation coefficient (NCC)
Figure 2C:
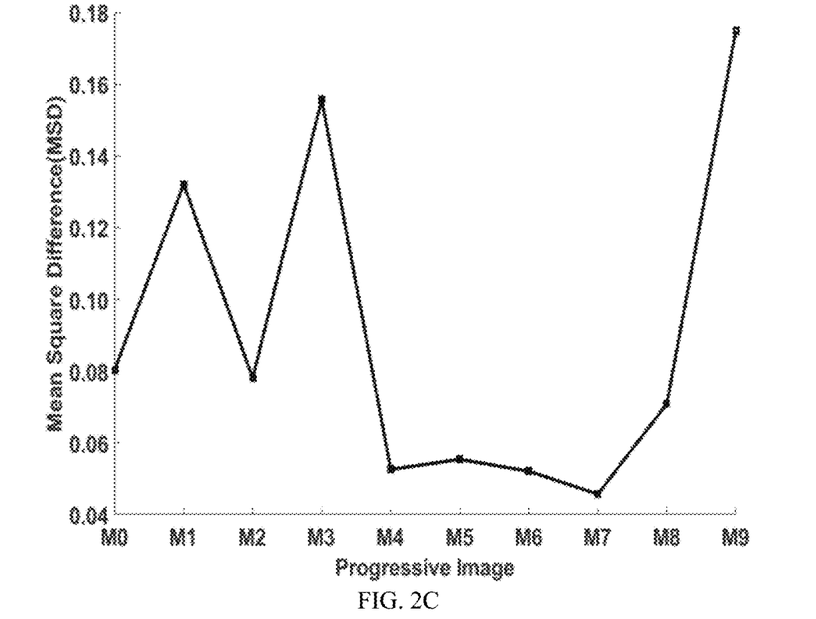
FIG. 2C shows the registration result measured by mean square difference (MSD)
Figure 2D:
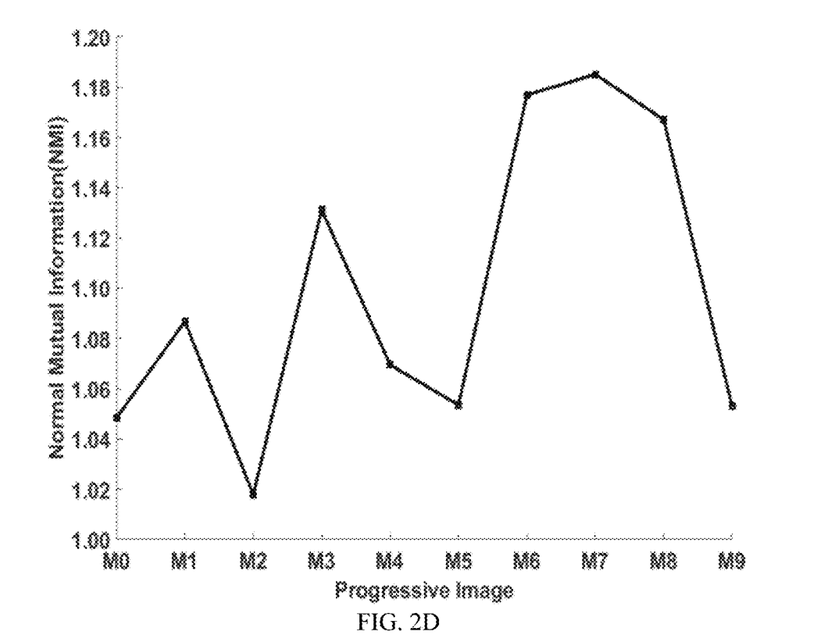
FIG. 2D shows the registration result measured by normalized mutual information (NMI).

As shown in FIG. 1, the present disclosure provides a two-stage medical image registration method based on progressive images (PIs). The method includes: generate intermediate PIs from a reference image and a floating image; subject the floating image to be registered and the intermediate PIs to be registered to initial registration by a speeded-up robust features (SURF) algorithm, which reduces the difference in image registration results; and subject coarse registration results and the reference image to fine registration, which improves the registration accuracy. The method specifically includes:

Step 1: Merge a reference image R to be registered with a floating image F to be registered to generate multiple intermediate PIs.

Sub-step 1: Average each corresponding pixel of the floating image F to be registered and the reference image R to be registered to acquire a resulting image, which is an intermediate progressive image $M_0$ of the floating image F and the reference image R, as shown in Eq. (1).

$$M_0(x,y)=(R(x,y)+F(x,y))/2 \quad (1)$$

Where R(x, y) F(x, y), and $M_0$ (x, y) denote values of pixels (x, y) of the reference image R, the floating image F, and the intermediate progressive image $M_0$, respectively.

Sub-step 2: Merge the generated intermediate progressive image with the floating image F to be registered or the reference image R to be registered according to sub-step 1 to generate multiple intermediate PIs $M_0$, $M_1$, ..., $M_l$, where l denotes a count of the intermediate PIs. The multiple intermediate PIs are generated as follows: take the generated intermediate progressive image as a reference image for an intermediate registration process and merge the reference image with the floating image F to generate the multiple intermediate PIs; or, take the generated intermediate progressive image as a floating image for the intermediate registration process and merge the floating image with the reference image R to generate the multiple intermediate PIs.

Step 2: Register, by the SURF algorithm and an affine transformation, the floating image F with the intermediate PIs to acquire coarse registration results.

Sub-step 3: Take an intermediate progressive image $M_k$ as a reference image and extract, by the SURF algorithm, feature points of the floating image F and the intermediate progressive image $M_k$, k=0, 1, 2 ... l.

A pixel sum of a rectangle is quickly calculated by the SURF algorithm through an integral image. For a value I(x, y) of any pixel (x, y) in the image, a value $I_\Sigma(x, y)$ of the integral image is expressed by Eq. (2).

$$I_\Sigma(x, y) = \sum_{x' \le x, y' \le y} I(x', y') \quad (2)$$

where I(x', y') denotes an original image, and the integral image is acquired by scanning all pixels in the original image I(x', y') once according to Eq. (2). With the help of the integral image, the Gaussian filtering of the image by a Gaussian function are transformed into addition and subtraction operation of the integral image, which can significantly improve the calculation speed.

A Hessian matrix is constructed to generate stable edge points of the image. When a discriminant of the Hessian matrix acquires a local maximum, it is determined that a current point is brighter or darker than other point in a neighborhood to locate a key point. Let f(x, y) be an image function, then the discriminant of the Hessian matrix is:

$$\det(H) = \frac{\partial^2 f}{\partial x^2}\frac{\partial^2 f}{\partial y^2} - \left(\frac{\partial^2 f}{\partial x \partial y}\right)^2,$$

The feature points need to be scale-invariant. Gaussian filtering is performed prior to constructing the Hessian matrix, and after the filtering, the Hessian matrix is expressed by Eq. (3).

$$H(x, y, \sigma) = \begin{bmatrix} L_{xx}(x, y, \sigma) & L_{xy}(x, y, \sigma) \\ L_{xy}(x, y, \sigma) & L_{yy}(x, y, \sigma) \end{bmatrix} \quad (3)$$

where $L_{xx}$ (x, y, σ) denotes a convolution of a Gaussian second-order partial derivative $$\frac{\partial^2}{\partial x^2} g(x, y, \sigma)$$

with the floating image at the pixel (x, y); $L_{xx}$(x, y, σ) and $L_{yy}$(x, y, σ) also denote convolutions; and the two-dimensional Gaussian function g(x, y, σ) is expressed by Eq. (4).

$$g(x, y, \sigma) = \frac{1}{2\pi\sigma^2}\exp\left(-\frac{x^2+y^2}{2\sigma^2}\right) \quad (4)$$

where σ denotes a spatial scale factor. In order to keep the image scale-invariant, the SURF algorithm constructs an image pyramid by convolving a scaling-up box filter with the floating image to form a scale space. Each pixel processed by the Hessian matrix is compared with 26 points in a neighborhood of an image space and the scale space, and key points are located preliminarily. A key point with weak energy and a falsely located key point are eliminated, and final stable feature points are preserved.

Sub-step 4: Describe the feature points after the extraction to acquire feature vectors and perform feature point matching based on a similarity of the feature vectors.

After the extraction of the feature points is completed, the feature points are described, which mainly includes two steps. First, the direction of the feature points is assigned to ensure the rotation invariance of the algorithm. Haar wavelet responses of a point in x and y directions in a neighborhood with a radius of 6s centering on the feature point are calculated with s denoting a scale value where the feature point is located. Gaussian weighting is performed with a factor of 2s on the calculated Haar wavelet responses in the x and y directions to acquire weighted values, where the weighted values denote direction components in horizontal and vertical directions, respectively. Haar wavelet responses dx and dy in a sector-shaped slide window with an angle of π/3 centering on the feature point are added up, and a direction of a sector with a maximum is selected as a dominant direction of the feature point. Second, after the dominant direction of the feature point is selected, a square with a side length of 20s centering on the feature point is selected, and a dominant direction of the square is rotated to the dominant direction of the feature point. The square is divided into 16 sub-regions. 25 sample points are selected for each sub-region, and the Haar wavelet responses dx and dy of the sample point are calculated. The Haar wavelet responses and absolute values thereof of four smaller sub-regions are summed to acquire four-dimensional vectors $\Sigma d_x$, $\Sigma d_y$, $\Sigma |d_x|$, and $\Sigma |d_y|$. The vectors of 16 sub-regions are added to the feature vector to acquire a 64-dimensional feature vector descriptor.

The feature point matching is converted into similarity measurement between each feature descriptor and a matching degree is determined by a Euclidean distance between two feature vectors. A shorter Euclidean distance indicates a higher matching degree between the two feature points. If the two feature points of the floating image F and the intermediate progressive image $M_I$ are $x=(x_1, x_2, \ldots, x_t)$ and $x'=(x_1', x_2', \ldots, x_t')$, respectively, the Euclidean distance between the two feature points x and x' is expressed by Eq. (5).

$$dist = \sqrt{\sum_{t=1}^{n}(x_t - x_t')^2} \quad (5)$$

Sub-step 5: Spatially transform, by the affine transformation, the floating image F and calculate, by an LS method, a transformation parameter; transform the floating image F into a coordinate system of the reference image R through the transformation parameter; and register, by a bicubic interpolation function, the transformed floating image F with the reference image R to acquire an initial registration result, which is the coarse registration result.

The affine transformation is essentially a simple superposition of a linear transformation and a translation transformation and includes the following basic transformations: scaling, translation, rotation, reflection, and skew. The affine transformation is an important transformation in a two-dimensional plane and is widely used in image registration. In two-dimensional image transformation, the affine transformation is generally expressed by Eq. (6).

$$\begin{bmatrix} x \\ y \\ 1 \end{bmatrix} = \begin{bmatrix} R_{00} & R_{01} & T_x \\ R_{10} & R_{11} & T_y \\ 0 & 0 & 1 \end{bmatrix} \begin{bmatrix} x' \\ y' \\ 1 \end{bmatrix} = M \begin{bmatrix} x' \\ y' \\ 1 \end{bmatrix} \quad (6)$$

That is:

$$x=R_{00}x'+R_{01}y'+T_x, y=R_{10}x'+R_{11}y'+T_y \quad (7)$$

where M denotes an affine transformation matrix; x and y denote coordinates of a matching point in the reference image R; and x' and y' denote coordinates of a matching point in the floating image F. The affine transformation involves 6 parameters and theoretically requires at least 6 equations. In practice, the count of matching pairs is often greater than 6, so the LS method can be used to calculate the transformation parameters.

The floating image F is transformed into the coordinate system of the reference image R through the transformation parameter to keep the floating image F consistent with the reference image R in terms of spatial position. Then, an indirect resampling method is used to protect the registered image from pixel coverage, and a bicubic interpolation function is used to perform image registration and acquire initial registration results.

Step 3: Register, by the SURF algorithm and the affine transformation, the reference image R with the coarse registration results to acquire fine registration results.

Sub-step 6: Take the initial registration result as a floating image in the fine registration process and register the floating image with the reference image. The operations of sub-steps 3, 4 and 5 are repeated to further accurately register the initial registration result as the floating image with the reference image to acquire the final registration image.

Step 4: Compare the fine registration results of the intermediate PIs, which are acquired by repeating steps 2 and 3 and select an optimal registration result as a final registration image.

Sub-step 7: Repeat sub-steps 3, 4, 5, and 6 until the registration result is optimal.

Similarity measures are used to evaluate the result of the image registration. During the registration process, the floating image is gradually aligned to the reference image, and the two images are most similar when the similarity measure is at the maximum/minimum. Several prevalent similarity measures are described below.

Mutual information (MI) is a measure of a degree of mutual dependence between random variables, and it is used to evaluate the registration effect of the reference image R and the floating image F. The MI of the reference image R and the floating image F is:

$$MI(R,F)=H(R)+H(F)-H(R,F) \quad (7)$$

where H(R) and H(F) respectively denote information in the reference image R and the floating image F, as shown in Eqs. (8) and (9); and H(R, F) denotes a joint entropy of the reference image R and the floating image F, as shown in Eq. (10).

$$H(R)=-\Sigma P_R(r)\log_2 P_R(r) \quad (8)$$

$$H(F)=-\Sigma P_F(f)\log_2 P_F(f) \quad (9)$$

$$H(R,F)=-\Sigma P_{RF}(r,f)\log_2 P_{RF}(r,f) \quad (10)$$

where $P_R$ (r) and $P_F$ (I) denote independent probability distributions of pixel information in the reference image R and the floating image F, respectively; and $P_{RF}$ (r, f denotes a joint probability distribution.

Normalized mutual information (NMI) is a measure of a degree of similarity between the reference image R and the floating image F. A larger value of NMI indicates a higher similarity of the two images. It is usually used as an evaluation index in image registration and is expressed by Eq. (11).

$$NMI(R, F) = \frac{H(R) + H(F)}{H(R, F)} \qquad (11)$$

Normalized correlation coefficient NCC is a common image registration index. It is in the range of [0,1] and is expressed by Eq. (12).

$$NCC(R, F) = \frac{\sum_{i=1}^{m}\sum_{y=1}^{n}(R(x, y) - \bar{R})(F(x, y) - \bar{F})}{\sqrt{\left(\sum_{i=1}^{m}\sum_{y=1}^{n}(R(x, y) - \bar{R})^2\right)}\sqrt{\left(\sum_{i=1}^{m}\sum_{y=1}^{n}(F(x, y) - \bar{F})^2\right)}} \qquad (12)$$

where $\bar{R}$ denotes a mean of all pixels in the reference image R; $\bar{F}$ denotes a mean of all pixels in the floating image F; and m*n denotes a size of the image.

Mean square difference (MSD) is a measure of similarity based on an intensity difference between the reference image R and the floating image F. When the two images are the most similar, their MSD is the smallest. MSD is expressed by Eq. (13).

$$MSD = \frac{\sum_{x=1}^{m}\sum_{y=1}^{n}(R(x, y) - F(x, y))^2}{N} \qquad (13)$$

where R(x, y) and F(x, y) denote intensities of pixels (x, y) in the reference image R and the floating image F, respectively; N denotes a total count of pixels in the image; and m*n denotes the size of the image.

The present disclosure implements medical image registration by progressive registration by combining progressive images with the SURF algorithm, thereby gradually improving the registration accuracy.

In order to verify the accuracy and validity of the algorithm proposed by the present disclosure, the matching experiments of feature points from two images, unimodal magnetic resonance imaging-magnetic resonance imaging (MRI-MRI) registration, and multimodal computed topography-magnetic resonance imaging (CT-MR) registration were carried out. The experiments were implemented with an experimental system of Matlab R2019a in Windows 10 and a hardware platform of Intel(®) Core™ i7-9750H CPU@2.60 GHz, 32 GB of memory. The developed algorithm, namely PI-SURF of the present disclosure is compared with the four state-of-the-art registration algorithms, namely the MI algorithm, Demons algorithm, Demons+B-spline algorithm, and SURF algorithm.

The present disclosure generates intermediate PIs and performs progressive image registration. The selection of the intermediate PIs directly affects the final image registration accuracy. Therefore, the floating image and the reference image are processed according to Eq. (1) to generate an intermediate progressive image $M_0$. Then the floating image and the intermediate progressive image $M_0$ are processed according to Eq. (1) to generate an intermediate progressive image $M_1$. In the same way, intermediate PIs $M_2$, $M_3$, . . . and $M_9$ are generated. The generated intermediate progressive image is taken as a reference image for coarse registration with the floating image to acquire the initial registration result, and the initial registration result and the reference image are finely registered to acquire the final registration result. The MI, NCC, MSD, and NMI between the final registration result and the reference image are calculated, and the four evaluation indexes of the intermediate PIs $M_0$, $M_1$, . . . , and $M_9$ are acquired, as shown in FIGS. 2A-2D.

FIGS. 2A, 2B, 2C, and 2D show the MI, NCC, MSD, and NMI of the intermediate PIs $M_0$ to $M_9$, respectively. It can be seen from FIGS. 2A-2D that the evaluation indexes of the image registration result acquired by selecting $M_7$ as the intermediate progressive image are better than other intermediate PIs. As the MSD decreases, a registration accuracy of the two images increases. Therefore, in FIG. 2C, the MSD of the intermediate progressive image $M_7$ is the smallest. In addition, the final registration effect generated by the intermediate PIs $M_8$ and $M_9$ is inferior to that of $M_7$. The reason is that as more intermediate PIs are generated, the effect of the edge feature points of the images acquired by initial registration is less ideal. This affects the choice of the spatial transformation parameter, thereby reducing the image registration effect. Therefore, the present disclosure selects $M_7$ as the intermediate template to complete the progressive image registration process.

Figure 3A:
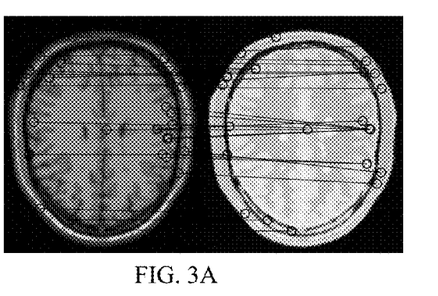
FIG. 3A shows the direct matching of feature points.

According to the SURF algorithm, the feature points of the floating image and the reference image are extracted to complete the feature point matching of the two images. The direct feature point matching effect between the floating image and the reference image is shown in FIG. 3A. The feature point matching effect of the algorithm proposed in the present disclosure is shown in FIGS. 3B and 3C.

Figure 3B:
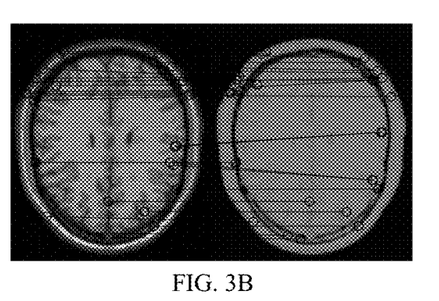
FIG. 3B shows the coarse registration.
Figure 3C:
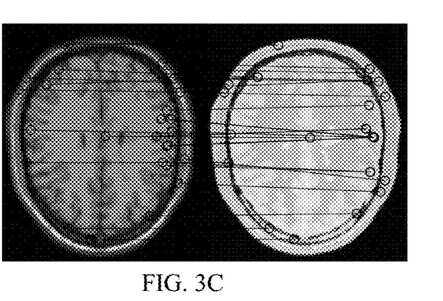
FIG. 3C shows the fine registration.

The comparison of FIGS. 3A, 3B, and 3C shows that if the two images are directly registered, the edge feature points of the two images extracted by the SURF algorithm are relatively small, which affects the effect of image edge registration. In addition, in the internal feature point matching of images, multiple feature points in the floating image may point to the same feature point in the reference image at the same time. In this case, the acquired parameters of the floating image are inaccurate, which greatly reduces the registration accuracy of the two images. The progressive registration algorithm proposed by the present disclosure utilizes the generated intermediate PIs. The present disclosure first performs coarse registration on the floating image and the progressive image to acquire more edge feature points, thereby improving the edge matching effect, as shown in FIG. 3B. Then the present disclosure further finely registers the generated initial registration image and the reference image, thereby reducing the matching error rate of internal feature points and improving the overall registration accuracy, as shown in FIG. 3C.

Figure 4A:
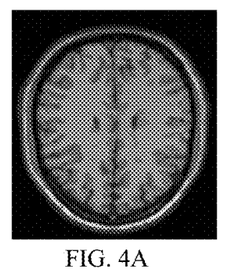
FIG. 4A shows the floating image.
Figure 4B:
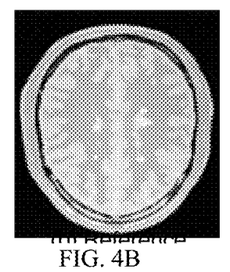
FIG. 4B shows the reference image.
Figure 4C:
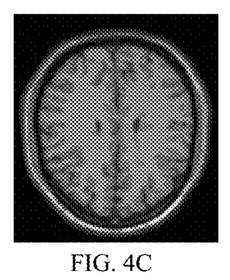
Figure 4D:
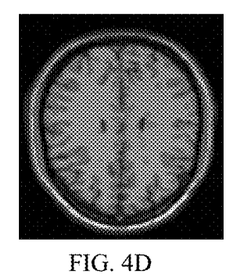
FIG. 4D shows the registration by Demons.
Figure 4E:
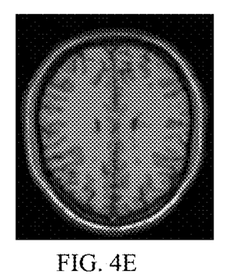
FIG. 4E shows the registration by Demons+B-spline.
Figure 4F:
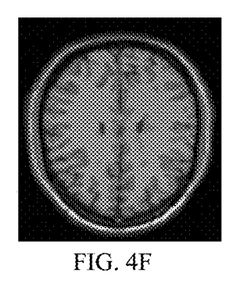
FIG. 4F shows the registration by speeded-up robust features (SURF)
Figure 4G:
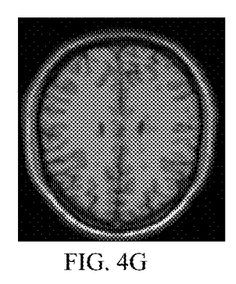
FIG. 4G shows the registration by PI-SURF of the present disclosure.

The unimodal MRI-MRI images are available in the Brainweb database of the Monte Neuromedicine Institute (MNI). Referring to FIGS. 4A-4G, FIG. 4A shows an MRI-T1 weighted image as the floating image F, and FIG. 4A shows an MM-PD weighted image as the reference image R. The gold standard contrast maps used in the experiment are all images registered by the medical experts manually. Each algorithm is tested 100 times, and the average values of MI, NCC, MSD, and NMI are calculated. FIGS. 4C to 4G show registration results of the floating image based on the MI algorithm, the Demons algorithm, the Demons+B-spline algorithm, the SURF algorithm, and the PI-SURF algorithm of the present disclosure.

The unimodal registration results are shown in Table 1. In general, compared with the Demons algorithm and the Demons+B-spline algorithm, the MI, NCC, and NMI of the PI-SURF algorithm of the present disclosure are improved, and the MSD is 91.9% and 92.5% lower than those of the first two algorithms, respectively.

TABLE 1

Comparison of experimental results of unimodal image registration

| Registration algorithms | Registration evaluation indexes | | | |
|---|---|---|---|---|
| | MI | NCC | MSD | NMI |
| MI | 1.4394 | 0.7703 | 0.0710 | 1.1149 |
| Demons | 2.0726 | 0.8389 | 0.1054 | 1.1971 |
| Demons+B-spline | 2.0845 | 0.6617 | 0.1094 | 1.1978 |
| SURF | 1.7156 | 0.8142 | 0.0197 | 1.1559 |
| PI-SURF | 2.2577 | 0.9219 | 0.0082 | 1.2161 |

The multimodal CT-MRI images are available on Kaggle (https://www.kaggle.comct-images). The registration results are evaluated by the four similarity measures, namely MI, NCC, MSD, and NMI. Higher values of the MI, NCC, and NMI indicate better registration effect of the reference image and the floating image.

Figure 5A:
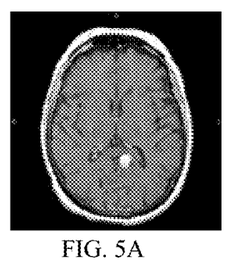
FIG. 5A shows the floating image.
Figure 5B:
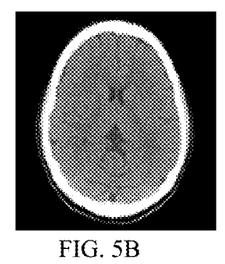
FIG. 5B shows the reference image.
Figure 5C:
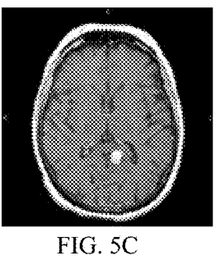
Figure 5D:
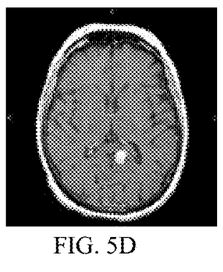
FIG. 5D shows the registration by Demons.
Figure 5E:
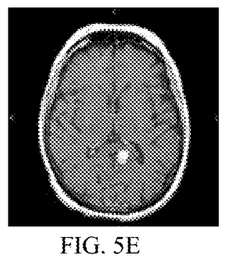
FIG. 5E shows the registration by Demons+B-spline.
Figure 5F:
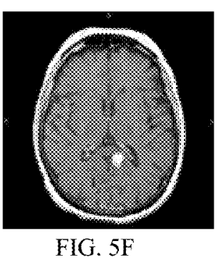
FIG. 5F shows the registration by SURF.
Figure 5G:
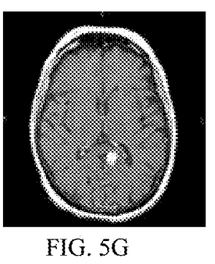
FIG. 5G shows the registration by PI-SURF of the present disclosure.

Table 2 shows the average values of 100 registration experiments using the MI, the NCC, the MSD, and the NMI as the measure functions for the reference image and the floating image. The results show that the PI-SURF algorithm of the present disclosure outperforms the other four algorithms in terms of MI, NCC, MSD, and NMI. FIG. 5A shows the MRI floating image, and FIG. 5B shows the CT reference image. FIGS. 5C to 5G show registration results of the floating image based on the MI algorithm, the Demons algorithm, the Demons+B-spline algorithm, the SURF algorithm, and the PI-SURF algorithm of the present disclosure.

TABLE 2

Comparison of experimental results of multimodal image registration

| Registration algorithms | Registration evaluation indexes | | | |
|---|---|---|---|---|
| | MI | NCC | MSD | NMI |
| MI algorithm | 1.3172 | 0.6543 | 0.0695 | 1.1617 |
| Demons | 1.2712 | 0.6634 | 0.0677 | 1.1559 |
| Demons+B-spline | 1.3255 | 0.6837 | 0.0632 | 1.1609 |
| SURF | 1.3733 | 0.5847 | 0.06 | 1.1539 |
| PI-SURF | 1.5861 | 0.7334 | 0.0521 | 1.1769 |

The experimental results of unimodal and multimodal registration show that the PI-SURF algorithm of the present disclosure improves the registration accuracy compared to the MI algorithm, the Demons algorithm, the Demons+B-spline algorithm and the SURF algorithm. This improvement is mainly due to the intermediate progressive image generated from the reference image and the floating image, which makes it possible to extract more feature points between the two images. Since the matching feature points between the two images are increased, the registration accuracy is improved. The registration results show that the evaluation indexes in the algorithm of the present disclosure are all improved. Compared with these four registration algorithms, the PI-SURF algorithm of the present disclosure has higher accuracy and higher clinical application value.

The experimental results show that the PI-SURF algorithm of the present disclosure is more powerful and robust than other registration methods, which verifies the effectiveness of the progressive registration mechanism proposed by the present disclosure.

The key of the PI-SURF algorithm of the present disclosure is the progressive registration mechanism. As shown in FIG. 3A, the floating image is registered directly with the reference image, and the matching pairs of feature points acquired from the two images and the matching accuracy are reduced. This phenomenon occurs because the SURF algorithm performs the feature matching of the two images by calculating the extreme point in the image and using it as the feature point. Some feature points cannot be detected in this process. For example, dark spots in bright regions or bright spots in dark regions cannot be detected by the SURF algorithm, resulting in the loss of some key image feature points. In FIG. 3A, there are 30 matching pairs of feature points between the floating image and the reference image, among which 16 pairs are mismatched and 14 pairs are correctly matched, with a low correct matching rate of 47%. Through the progressive registration mechanism, the intermediate progressive image is generated and is coarsely registered with the floating image. The feature point matching result of the two images is shown in FIG. 3B. There are 30 matching pairs between the floating image and the intermediate progressive image in the coarse registration stage, including 7 pairs of mismatched feature points and 33 pairs of correctly matched feature points, with a high correct matching rate of 77%. Further, the initial image registration result is continuously registered with the reference image, and the feature point matching result is shown in FIG. 3C. There are 39 matching pairs of feature points between the floating image and the intermediate progressive image, among which 13 pairs are mismatched and 16 pairs are correctly matched, with a correct matching rate of 55%. The data shows that, compared with the direct registration from the floating image to the reference image, in the progressive registration mechanism, the count of matching pairs of feature points between the two images in the initial registration stage is the same, and the count of mismatched pairs of feature points decreases by 9. That is, the count of correctly matched pairs increases by 9, and the correct matching rate increases by 30%. For the fine registration, the count of matching pairs of feature points decreases, but the count of correctly matched pairs increases, and the correct matching rate increases by 8%. Moreover, compared with the direct registration between the two images, the proposed coarse-to-fine registration of the present disclosure avoids the situation in which multiple feature points are matched to the same feature point, thereby providing reliable coordinates for the subsequent spatial transformation.

The comparison algorithms used in the present disclosure include intensity-based registration algorithms, such as the MI algorithm, the Demons algorithm, and the Demons+B-spline algorithm. The MI algorithm is used to calculate the entropy of two images to measure the degree of mutual inclusion of information between them. A larger degree of similarity or a larger overlap area between the two images indicates a larger degree of mutual inclusion of information and a more ideal registration result between the two images. However, MI is sensitive to the overlap area between the two images. A small overlap area of two images indicates small MI and low registration accuracy. The Demons algorithm and the Demons+B-spline algorithm are based on the principle of intensity conservation, but for multimodal images, the driving force cannot be simply calculated based on intensity. The SURF algorithm is a feature-based registration algorithm, which has high efficiency and can save the registration time effectively. However, the SURF algorithm is unstable when searching for feature points and matching between point pairs, and it is easy to make more mismatches, which will influence the registration accuracy. In the present disclosure, the progressive registration mechanism can guarantee both the accuracy of intensity-based image registration and the efficiency of feature-based image registration.

The intermediate PIs of the present disclosure are generated by Eq. (1), and the count of the selected intermediate PIs determines the time required for the entire registration process. In order to solve the problem of low registration accuracy existing in the traditional medical image registration algorithms, the present disclosure proposes the PI-SURF algorithm for medical image registration, which realizes the accurate progressive registration process from the floating image to the reference image. The experiments on the two-dimensional unimodal and multimodal image registration show that the intermediate progressive image registration of the present disclosure achieves desired registration results and has strong robustness. Compared with other traditional algorithms, the present disclosure improves the registration accuracy and has application and reference value for clinical medical image registration. However, due to the necessity of generating the intermediate PIs, the time consumed by the registration is prolonged, which compromises the registration efficiency to a certain extent.

The above described are merely preferred embodiments of the present disclosure and are not intended to limit the present disclosure. Any modifications, equivalent replacements, and improvements made within the spirit and principle of the present disclosure should all fall within the scope of protection of the present disclosure.

What is claimed is:

1. A two-stage medical image registration method based on progressive images (PIs) comprising the following steps:
    step 1: merging a reference image R to be registered with a floating image F to be registered to generate multiple intermediate PIs;
    step 2: registering, by a speeded-up robust features (SURF) algorithm and an affine transformation, the floating image F with the intermediate PIs to acquire coarse registration results;
    step 3: registering, by the SURF algorithm and the affine transformation, the reference image R with the coarse registration results to acquire fine registration results; and
    step 4: comparing the fine registration results of the intermediate PIs acquired in repeating steps 2 and 3 and selecting an optimal registration result as a final registration image,
    wherein the multiple intermediate PIs are generated as follows: taking the intermediate progressive image as a reference image for an intermediate registration process and merging the reference image with the floating image F to generate the multiple intermediate PIs; or, taking the intermediate progressive image as a floating image for the intermediate registration process and merging the floating image with the reference image R to generate the multiple intermediate PIs, and
    wherein in step 2, the coarse registration result is acquired as follows:
        sub-step 1: taking an intermediate progressive image $M_k$ as a reference image and extracting, by the SURF algorithm, feature points of the floating image F and the intermediate progressive image $M_k$, k=0, 1, 2 . . . l;
        sub-step 2: describing the feature points to acquire feature vectors and performing feature point matching based on a similarity of the feature vectors; and
        sub-step 3: spatially transforming, by the affine transformation, the floating image F, and calculating, by a least squares (LS) method, a transformation parameter; transforming the floating image F into a coordinate system of the reference image R through the transformation parameter; and registering, by a bicubic interpolation function, the transformed floating image F with the reference image R to acquire an initial registration result described as the coarse registration result.

2. The two-stage medical image registration method based on PIs according to claim 1, wherein in step 1, the merging comprises:
    averaging each corresponding pixel of the floating image F to be registered and the reference image R to be registered to acquire a resulting image described as an intermediate progressive image $M_0$ of the floating image F and the reference image R, $M_0(x, y)=(R(x, y)+F(x, y))/2$;
    wherein $R(x, y)$, $F(x, y)$, and $M_0(x, y)$ denote values of pixels (x, y) of the reference image R, the floating image F, and the intermediate progressive image $M_0$, respectively; and
    merging the intermediate progressive image with the floating image F to be registered or the reference image R to be registered to generate multiple intermediate PIs $M_0, M_1, \ldots, M_l$, wherein l denotes a count of the intermediate PIs.

3. The two-stage medical image registration method based on PIs according to claim 2, wherein the method further comprises: calculating, by the SURF algorithm, a pixel sum of a rectangle quickly through an integral image, wherein for a value $I(x, y)$ of any pixel (x, y) in the image, a value $I_\Sigma(x, y)$ of the integral image is:

$$I_\Sigma(x, y) = \sum_{x' \leq x, y' \leq y} I(x', y');$$

wherein $I(x', y')$ denotes an original image, and the integral image is acquired by scanning all pixels in the original image $I(x', y')$ once; and
constructing, by the SURF algorithm, a Hessian matrix to generate stable edge points of the image; and determining, when a discriminant of the Hessian matrix acquires a local maximum, that a current point is brighter or darker than other point in a neighborhood to locate a key point.

4. The two-stage medical image registration method based on PIs according to claim 3, wherein the discriminant of the Hessian matrix is:

$$\det(H) = \frac{\partial^2 f}{\partial x^2} \frac{\partial^2 f}{\partial y^2} - \left(\frac{\partial^2 f}{\partial x \partial y}\right)^2,$$

f(x, y) being an image function;

the method further comprises: performing Gaussian filtering on the Hessian matrix to acquire:

$$H(x, y, \sigma) = \begin{bmatrix} L_{xx}(x, y, \sigma) & L_{xy}(x, y, \sigma) \\ L_{xy}(x, y, \sigma) & L_{yy}(x, y, \sigma) \end{bmatrix};$$

wherein $L_{xx}(x, y, \sigma)$, $L_{xy}(x, y, \sigma)$, and $L_{yy}(x, y, \sigma)$ respectively denote convolutions of Gaussian second-order partial derivatives $$\frac{\partial^2}{\partial x^2} g(x, y, \sigma), \frac{\partial^2}{\partial x \partial y} g(x, y, \sigma), \text{ and } \frac{\partial^2}{\partial y^2} g(x, y, \sigma)$$

with the floating image at the pixel (x, y); and a two-dimensional Gaussian function g(x, y, σ) is expressed as:

$$g(x, y, \sigma) = \frac{1}{2\pi\sigma^2} \exp\left(-\frac{x^2 + y^2}{2\sigma^2}\right),$$

wherein σ denotes a spatial scale factor.

5. The two-stage medical image registration method based on PIs according to claim 2, wherein the method further comprises: constructing, by the SURF algorithm, an image pyramid by convolving a scaling-up box filter with the floating image to form a scale space; comparing each pixel processed by the Hessian matrix with 26 points in a neighborhood of an image space and the scale space, and locating key points preliminarily; and eliminating a key point with weak energy and a falsely located key point, and preserving final stable feature points.

6. The two-stage medical image registration method based on PIs according to claim 2, wherein in sub-step 2, the feature points are described through two phases: first, assigning a direction to the feature point: calculating Haar wavelet responses of a point in x and y directions in a neighborhood with a radius of 6s centering on the feature point; performing Gaussian weighting with a factor of 2s on the calculated Haar wavelet responses in the x and y directions to acquire weighted values, wherein the weighted values denote direction components in horizontal and vertical directions, respectively, and s denotes a scale value where the feature point is located; and adding up Haar wavelet responses dx and dy in a sector-shaped slide window with an angle of π/3 centering on the feature point, and selecting a direction of a sector with a maximum as a dominant direction of the feature point; and second, selecting a square with a side length of 20s centering on the feature point; rotating a dominant direction of the square to the dominant direction of the feature point, and dividing the square into 16 sub-regions; selecting 25 sample points for each sub-region, and calculating the Haar wavelet responses dx and dy of the sample point; summing the Haar wavelet responses and absolute values thereof of four smaller sub-regions to acquire four-dimensional vectors $\Sigma_{dx}$, $\Sigma_{dy}$, $\Sigma|_{dx}|$, and $\Sigma|_{dy}|$; and adding the vectors of 16 sub-regions to the feature vector to acquire a 64-dimensional feature vector descriptor.

7. The two-stage medical image registration method based on PIs according to claim 6, wherein the feature point matching is converted into similarity measurement between each feature descriptor, and a matching degree is determined by a Euclidean distance between two feature vectors; and if feature points of the floating image F and the intermediate progressive image $M_I$ are $x=(x_1, x_2, \ldots, x_t)$ and $x'=(x_1', x_2', \ldots, x_t')$, respectively, the Euclidean distance between the feature points x and x' is:

$$dist = \sqrt{\sum_{t=1}^{n}(x_t - x_t')^2};$$

the affine transformation is a superposition of a linear transformation and a translation transformation and comprises the following basic transformations: scaling, translation, rotation, reflection, and skew; the affine transformation is a transformation in a two-dimensional plane, and is widely used in image registration; and in two-dimensional image transformation, the affine transformation is expressed as follows:

$$\begin{bmatrix} x \\ y \\ 1 \end{bmatrix} = \begin{bmatrix} R_{00} & R_{01} & T_x \\ R_{10} & R_{11} & y \\ 0 & 0 & 1 \end{bmatrix} \begin{bmatrix} x' \\ y' \\ 1 \end{bmatrix} = M \begin{bmatrix} x' \\ y' \\ 1 \end{bmatrix};$$

that is, $x=R_{00}x'+R_{01}y'+T_x$, $y=R_{10}x'+R_{11}y'+T_y$;

wherein M denotes an affine transformation matrix; x and y denote coordinates of a matching point in the reference image R; and x' and y' denote coordinates of a matching point in the floating image F; and after the floating image F is transformed into the coordinate system of the reference image R, an indirect resampling method is used to protect the registered image from pixel coverage.

8. The two-stage medical image registration method based on PIs according to claim 7, wherein the similarity measurement is intended to evaluate the registration between the floating image F and the reference image R and comprises the following evaluation indexes:

mutual information (MI), wherein MI is a measure of a degree of mutual dependence between random variables, wherein the MI of the reference image R and the floating image F is:

$MI(R,F)=H(R)+H(F)-H(R,F)$;

wherein H(R) and H(F) denote information in the reference image R and the floating image F, respectively; and H(R, F) denotes a joint entropy of the reference image R and the floating image F;

$H(R)=-\Sigma P_R(r)\log_2 P_R(r)$ $H(F)=-\Sigma P_F(f)\log_2 P_F(f)$ $H(R,F)=-\Sigma P_{RF}(r,f)\log_2 P_{RF}(r,f)$ wherein, $P_R(r)$ and $P_F(f)$ denote independent probability distributions of pixel information in the reference image R and the floating image F, respectively; and $P_{RF}(r, f)$ denotes a joint probability distribution;

normalized mutual information (NMI), wherein NMI is a measure of a degree of similarity between the reference image R and the floating image F:

$$NMI(R, F) = \frac{H(R) + H(F)}{H(R, F)};$$

normalized correlation coefficient (NCC):

$$NCC(R, F) = \frac{\sum_{x=1}^{m}\sum_{y=1}^{n}(R(x, y) - \bar{R})(F(x, y) - \bar{F})}{\sqrt{\left(\sum_{x=1}^{m}\sum_{y=1}^{n}(R(x, y) - \bar{R})^2\right)}\sqrt{\left(\sum_{x=1}^{m}\sum_{y=1}^{n}(F(x, y) - \bar{F})^2\right)}};$$

wherein $\bar{R}$ denotes a mean of all pixels in the reference image R; $\bar{F}$ denotes a mean of all pixels in the floating image F; and m*n denotes a size of the image; and mean square difference (MSD), wherein MSD is a measure of similarity based on an intensity difference between the reference image R and the floating image F:

$$MSD = \frac{\sum_{x=1}^{m}\sum_{y=1}^{n}(R(x, y) - F(x, y))^2}{N};$$

wherein R(x, y) and F(x, y) denote intensities of pixels (x, y) in the reference image R and the floating image F, respectively; N denotes a total count of pixels in the image; and m*n denotes the size of the image.

9. The two-stage medical image registration method based on PIs according to claim 1, wherein the method further comprises: calculating, by the SURF algorithm, a pixel sum of a rectangle quickly through an integral image, wherein for a value I(x, y) of any pixel (x, y) in the image, a value IΣ(x, y) of the integral image is:

$$I_\Sigma(x, y) = \sum_{x' \leq x, y' \leq y} I(x', y');$$

wherein I(x', y') denotes an original image, and the integral image is acquired by scanning all pixels in the original image I(x', y') once; and constructing, by the SURF algorithm, a Hessian matrix to generate stable edge points of the image; and determining, when a discriminant of the Hessian matrix acquires a local maximum, that a current point is brighter or darker than other point in a neighborhood to locate a key point.

10. The two-stage medical image registration method based on PIs according to claim 9, wherein the discriminant of the Hessian matrix is:

$$\det(H) = \frac{\partial^2 f}{\partial x^2}\frac{\partial^2 f}{\partial y^2} - \left(\frac{\partial^2 f}{\partial x \partial y}\right)^2,$$

f(x, y) being an image function;

the method further comprises: performing Gaussian filtering on the Hessian matrix to acquire:

$$H(x, y, \sigma) = \begin{bmatrix} L_{xx}(x, y, \sigma) & L_{xy}(x, y, \sigma) \\ L_{xy}(x, y, \sigma) & L_{yy}(x, y, \sigma) \end{bmatrix};$$

wherein $L_{xx}(x, y, \sigma)$, $L_{xy}(x, y, \sigma)$, and $L_{yy}(x, y, \sigma)$ respectively denote convolutions of Gaussian second-order partial derivatives $$\frac{\partial^2}{\partial x^2}g(x, y, \sigma), \frac{\partial^2}{\partial x \partial y}g(x, y, \sigma), \text{ and } \frac{\partial^2}{\partial y^2}g(x, y, \sigma)$$

with the floating image at the pixel (x, y); and a two-dimensional Gaussian function g(x, y, σ) is expressed as:

$$g(x, y, \sigma) = \frac{1}{2\pi\sigma^2}\exp\left(-\frac{x^2 + y^2}{2\sigma^2}\right),$$

wherein σ denotes a spatial scale factor.

11. The two-stage medical image registration method based on PIs according to claim 1, wherein the method further comprises: constructing, by the SURF algorithm, an image pyramid by convolving a scaling-up box filter with the floating image to form a scale space; comparing each pixel processed by the Hessian matrix with 26 points in a neighborhood of an image space and the scale space, and locating key points preliminarily; and eliminating a key point with weak energy and a falsely located key point, and preserving final stable feature points.

12. The two-stage medical image registration method based on PIs according to claim 11, wherein in sub-step 2, the feature points are described through two phases: first, assigning a direction to the feature point: calculating Haar wavelet responses of a point in x and y directions in a neighborhood with a radius of 6s centering on the feature point; performing Gaussian weighting with a factor of 2s on the calculated Haar wavelet responses in the x and y directions to acquire weighted values, wherein the weighted values denote direction components in horizontal and vertical directions, respectively, and s denotes a scale value where the feature point is located; and adding up Haar wavelet responses dx and dy in a sector-shaped slide window with an angle of π/3 centering on the feature point, and selecting a direction of a sector with a maximum as a dominant direction of the feature point; and second, selecting a square with a side length of 20s centering on the feature point; rotating a dominant direction of the square to the dominant direction of the feature point, and dividing the square into 16 sub-regions; selecting 25 sample points for each sub-region, and calculating the Haar wavelet responses dx and dy of the sample point; summing the Haar wavelet responses and absolute values thereof of four smaller sub-regions to acquire four-dimensional vectors $\Sigma_{dx}$, $\Sigma_{dy}$, $\Sigma|_{dx}|$, and $\Sigma|_{dy}|$; and adding the vectors of 16 sub-regions to the feature vector to acquire a 64-dimensional feature vector descriptor.

13. The two-stage medical image registration method based on PIs according to claim 1, wherein in sub-step 2, the feature points are described through two phases: first, assigning a direction to the feature point: calculating Haar wavelet responses of a point in x and y directions in a neighborhood with a radius of 6s centering on the feature point; performing Gaussian weighting with a factor of 2s on the calculated Haar wavelet responses in the x and y directions to acquire weighted values, wherein the weighted values denote direction components in horizontal and vertical directions, respectively, and s denotes a scale value where the feature point is located; and adding up Haar wavelet responses dx and dy in a sector-shaped slide window with an angle of π/3 centering on the feature point, and selecting a direction of a sector with a maximum as a dominant direction of the feature point; and second, selecting a square with a side length of 20s centering on the feature point; rotating a dominant direction of the square to the dominant direction of the feature point, and dividing the square into 16 sub-regions; selecting 25 sample points for each sub-region, and calculating the Haar wavelet responses dx and dy of the sample point; summing the Haar wavelet responses and absolute values thereof of four smaller sub-regions to acquire four-dimensional vectors $\Sigma_{dx}$, $\Sigma_{dy}$, $\Sigma|_{dx}|$, and $\Sigma|_{dy}|$; and adding the vectors of 16 sub-regions to the feature vector to acquire a 64-dimensional feature vector descriptor.

14. The two-stage medical image registration method based on PIs according to claim 13, wherein the feature point matching is converted into similarity measurement between each feature descriptor, and a matching degree is determined by a Euclidean distance between two feature vectors; and if feature points of the floating image F and the intermediate progressive image $M_I$ are $x=(x_1, x_2, \ldots, x_t)$ and $x'=(x_1', x_2', \ldots, x_t')$, respectively, the Euclidean distance between the feature points x and x' is:

$$dist = \sqrt{\sum_{t=1}^{n}(x_t - x_t')^2};$$

the affine transformation is a superposition of a linear transformation and a translation transformation and comprises the following basic transformations: scaling, translation, rotation, reflection, and skew; the affine transformation is a transformation in a two-dimensional plane, and is widely used in image registration; and in two-dimensional image transformation, the affine transformation is expressed as follows:

$$\begin{bmatrix} x \\ y \\ 1 \end{bmatrix} = \begin{bmatrix} R_{00} & R_{01} & T_x \\ R_{10} & R_{11} & T_y \\ 0 & 0 & 1 \end{bmatrix} \begin{bmatrix} x' \\ y' \\ 1 \end{bmatrix} = M \begin{bmatrix} x' \\ y' \\ 1 \end{bmatrix};$$

that is, $x=R_{00}x'+R_{01}y'+T_x$, $y=R_{10}x'+R_{11}y'+T_y$;

wherein M denotes an affine transformation matrix; x and y denote coordinates of a matching point in the reference image R; and x' and y' denote coordinates of a matching point in the floating image F; and after the floating image F is transformed into the coordinate system of the reference image R, an indirect resampling method is used to protect the registered image from pixel coverage.

15. The two-stage medical image registration method based on PIs according to claim 14, wherein the similarity measurement is intended to evaluate the registration between the floating image F and the reference image R and comprises the following evaluation indexes:

mutual information (MI), wherein MI is a measure of a degree of mutual dependence between random variables, wherein the MI of the reference image R and the floating image F is:

$MI(R,F)=H(R)+H(F)-H(R,F);$ wherein H(R) and H(F) denote information in the reference image R and the floating image F, respectively; and H(R, F) denotes a joint entropy of the reference image R and the floating image F;

$H(R)=-\Sigma P_R(r)\log_2 P_R(r)$ $H(F)=-\Sigma P_F(f)\log_2 P_F(f)$ $H(R,F)=-\Sigma P_{RF}(r,f)\log_2 P_{RF}(r,f)$ wherein, $P_R(r)$ and $P_F(f)$ denote independent probability distributions of pixel information in the reference image R and the floating image F, respectively; and $P_{RF}(r, f)$ denotes a joint probability distribution;

normalized mutual information (NMI), wherein NMI is a measure of a degree of similarity between the reference image R and the floating image F:

$$NMI(R, F) = \frac{H(R) + H(F)}{H(R, F)};$$

normalized correlation coefficient (NCC):

$$NCC(R, F) = \frac{\sum_{x=1}^{m}\sum_{y=1}^{n}(R(x,y)-\bar{R})(F(x,y)-\bar{F})}{\sqrt{\left(\sum_{x=1}^{m}\sum_{y=1}^{n}(R(x,y)-\bar{R})^2\right)}\sqrt{\left(\sum_{x=1}^{m}\sum_{y=1}^{n}(F(x,y)-\bar{F})^2\right)}};$$

wherein $\bar{R}$ denotes a mean of all pixels in the reference image R; $\bar{F}$ denotes a mean of all pixels in the floating image F; and m*n denotes a size of the image; and mean square difference (MSD), wherein MSD is a measure of similarity based on an intensity difference between the reference image R and the floating image F:

$$MSD = \frac{\sum_{x=1}^{m}\sum_{y=1}^{n}(R(x,y)-F(x,y))^2}{N};$$

wherein R(x, y) and F(x, y) denote intensities of pixels (x, y) in the reference image R and the floating image F, respectively; N denotes a total count of pixels in the image; and m*n denotes the size of the image.

16. The two-stage medical image registration method based on PIs according to claim 1, wherein the similarity measurement is intended to evaluate the registration between the floating image F and the reference image R and comprises the following evaluation indexes:

mutual information (MI), wherein MI is a measure of a degree of mutual dependence between random variables, wherein the MI of the reference image R and the floating image F is:

$MI(R,F)=H(R)+H(F)-H(R,F);$ wherein H(R) and H(F) denote information in the reference image R and the floating image F, respectively; and H(R, F) denotes a joint entropy of the reference image R and the floating image F;

$H(R)=-\Sigma P_R(r)\log_2 P_R(r)$ $H(F)=-\Sigma P_F(f)\log_2 P_F(f)$ $H(R,F)=-\Sigma P_{RF}(r,f)\log_2 P_{RF}(r,f)$ wherein, $P_R(r)$ and $P_F(f)$ denote independent probability distributions of pixel information in the reference image R and the floating image F, respectively; and $P_{RF}(r, f)$ denotes a joint probability distribution;

normalized mutual information (NMI), wherein NMI is a measure of a degree of similarity between the reference image R and the floating image F:

$$NMI(R, F) = \frac{H(R) + H(F)}{H(R, F)};$$

normalized correlation coefficient (NCC):

$$NCC(R, F) = \frac{\sum_{x=1}^{m}\sum_{y=1}^{n}(R(x, y) - \bar{R})(F(x, y) - \bar{F})}{\sqrt{\left(\sum_{x=1}^{m}\sum_{y=1}^{n}(R(x, y) - \bar{R})^2\right)}\sqrt{\left(\sum_{x=1}^{m}\sum_{y=1}^{n}(F(x, y) - \bar{F})^2\right)}};$$

wherein $\bar{R}$ denotes a mean of all pixels in the reference image R; $\bar{F}$ denotes a mean of all pixels in the floating image F; and m*n denotes a size of the image; and mean square difference (MSD), wherein MSD is a measure of similarity based on an intensity difference between the reference image R and the floating image F:

$$MSD = \frac{\sum_{x=1}^{m}\sum_{y=1}^{n}(R(x, y) - F(x, y))^2}{N};$$

wherein R(x, y) and F(x, y) denote intensities of pixels (x, y) in the reference image R and the floating image F, respectively; N denotes a total count of pixels in the image; and m*n denotes the size of the image.

\* \* \* \* \*